Jan. 14, 1969  O. K. HUSMANN  3,421,864
MULTILAYER POROUS IONIZER
Filed June 7, 1965  Sheet 1 of 3

INVENTOR
OTTO K. HUSMANN.
BY
John M. Koch
ATTORNEY.

United States Patent Office 3,421,864
Patented Jan. 14, 1969

3,421,864
MULTILAYER POROUS IONIZER
Otto K. Husmann, Santa Monica, Calif., assignor, by mesne assignments, to The United States of America as represented by the Administrator of the National Aeronautics and Space Administration
Filed June 7, 1965, Ser. No. 461,765
U.S. Cl. 29—182.2              8 Claims
Int. Cl. B22f 3/00; B22f 5/00; B22f 7/00

ABSTRACT OF THE DISCLOSURE

An ion source is provided comprising at least two center layers. One of these layers, the substrate, is thick and porous, and is composed of large-sized grains. The layer on the substrate is relatively thin, is porous, and has grains of micron size. Both materials are refractory metals such as tungsten.

---

This invention relates to a refractory porous structure or article for use as a vapor phase ionizer and particularly a multilayer porous refractory metal ionizer for vapor phase contact ionization purposes. The invention described herein was made in the performance of work under a NASA contract and is subject to the provisions of Sec. 305 of the National Aeronautics & Space Act of 1958, Public Law 85–568 (72 Stat. 435; 42 U.S.C. 2457).

A two-layer porous ion source instead of a one-layer source, provides an improved solution for minimizing the values of neutral efflux and critical temperature for surface ionization. Such a two-layer ionizer comprises a thin layer of micron pore size material formed over a thicker porous base layer composed of larger size grains. The base layer need not be of the same material as the thin over-layer.

Accordingly, it is a primary object of this invention to provide a porous ionizer body composed of a plurality of porous layers wherein each layer contains pores or interstices of different size ranges to optimize or permit variations of the ion emission characteristics of the various ionization surfaces.

Another object of this invention is to provide a multilayer porous ionizer having ionizing surfaces of optimum uniformity for evaporation of ions from the hot ionizing surfaces of the ionizer with a minimum of atom evaporation.

Additional objects of the invention will become apparent from the following description, which is given primarily for purposes of illustration, and not limitation.

Stated in general terms, the objects of the invention are attained by applying a thin layer of porous refractory material, such as a thin layer of a porous metal or metal alloy, upon a thicker, higher pore density layer or substrate material, such as high temperature stable porous structures, including refractory metals, refractory metal alloys and ceramics.

A more detailed description of specific embodiments of the invention is given below with reference to the accompanying drawings, wherein.

Figure 1:
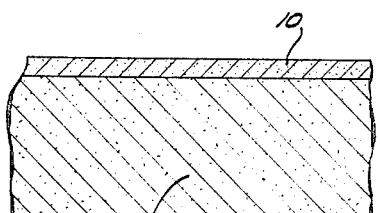
FIG. 1 is a partial schematic sectional view drawn to a greatly enlarged scale showing the relationship between a thin layer of micron grain size material over a thicker porous layer of larger grains in a two-layer ionizer structure.

In general, application of a thin layer of porous refractory metal or metal alloy 10, as shown in FIG. 1, on the high pore density substrate 11, increases the pore density of the ionizing surface, if the thin layer density does not exceed about 70% of its theoretical density while the substrate density ranges between about 72 and about 82 percent of its theoretical density. The surface layer 10 is not required to provide mechanical strength. Therefore, high porosity, connected with high pore density can be achieved.

The layer density of the thin layer 10 can range between 60 and about 70 percent of the theoretical maximum density. The grain size of the coating material 10 should not be below about 1 micron. A preferred lower limit in grain size is between about 2.0 and about 3.0 microns. In the case of porous tungsten, the grain size of the particles in thin layer 10 should be in the range from about 2.0 to 3.0 microns to about 5.5 to 6.0 microns, preferably about 4.0 microns.

This grain size limit is chosen to prevent sintering of the coating 10 during operation in the temperature range between about 1,300° and about 1,500° K. In this manner pore densities by the line intercept technique exceeding the low $10^6$ pores per cm.² range of the prior art are possible. The pore density of thin layer 10 preferably should range from about $5 \times 10^6$ to about $5 \times 10^7$ pores per square centimeter and the density preferably should be about 75 percent of the theoretical maximum density.

The pore density of the substrate layer 11 preferably is in the range from about $5 \times 10^5$ to about $5 \times 10^6$ pores per square centimeter and the grain size may cover any range necessary to achieve this requirement. Narrow grain size particle distributions of the original refractory metal powder, preferably spherical particles, have given the best results. Sintering stability tests indicate satisfactory results have been obtained for tungsten grain sizes between about 4.0 to about 7.0 microns, preferably about 6.0 microns grain size and density of about 80 to about 82 percent of the theoretical maximum density.

Figure 2:
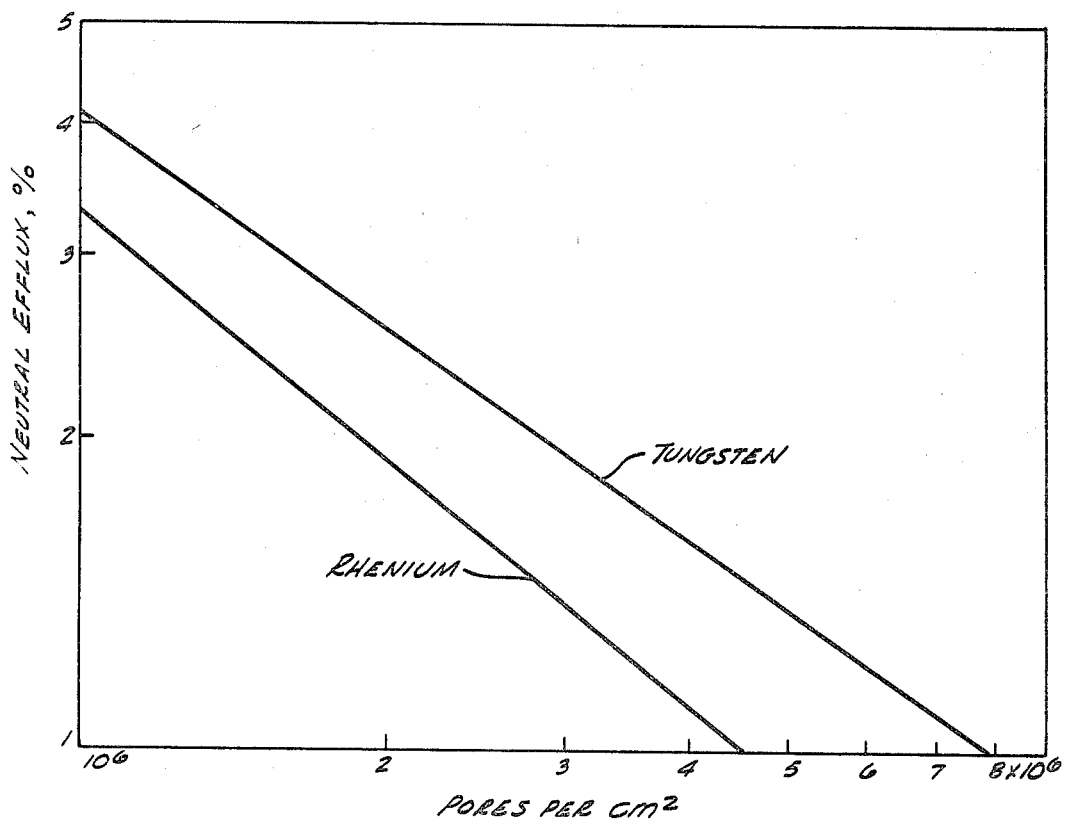
FIG. 2 is a graph showing the relationship of the percent neutral efflux to pore density in pores per square centimeters for porous tungsten and porous rhenium.

Neutral efflux, pore density and ion current density for the use of a porous tungsten ionizer with cesium vapor, are connected by the equation:

Log $F = 0.8$ (log $j + 8.75 -$ log $N$) where F is the neutral efflux in percent, $j$ is the ion current density in amps/cm.², and N is the pore density in pores per cm.². This relationship is plotted in FIG. 2 for a cesium ion current density of 10 ma./cm.², where the ordinate is the neutral efflux in percent and the abscissa is the pore density in pores per square centimeter. Thus, to improve the surface ionization characteristics, a high pore density substrate 11, as shown in FIG. 1, of refractory metal or metal alloy is coated with a thin layer 10 of low compaction density. Ionization takes place on the surface layer 10 upon diffusion through the porous structure formed by the surface layer and the porous substrate 11.

Figure 3:
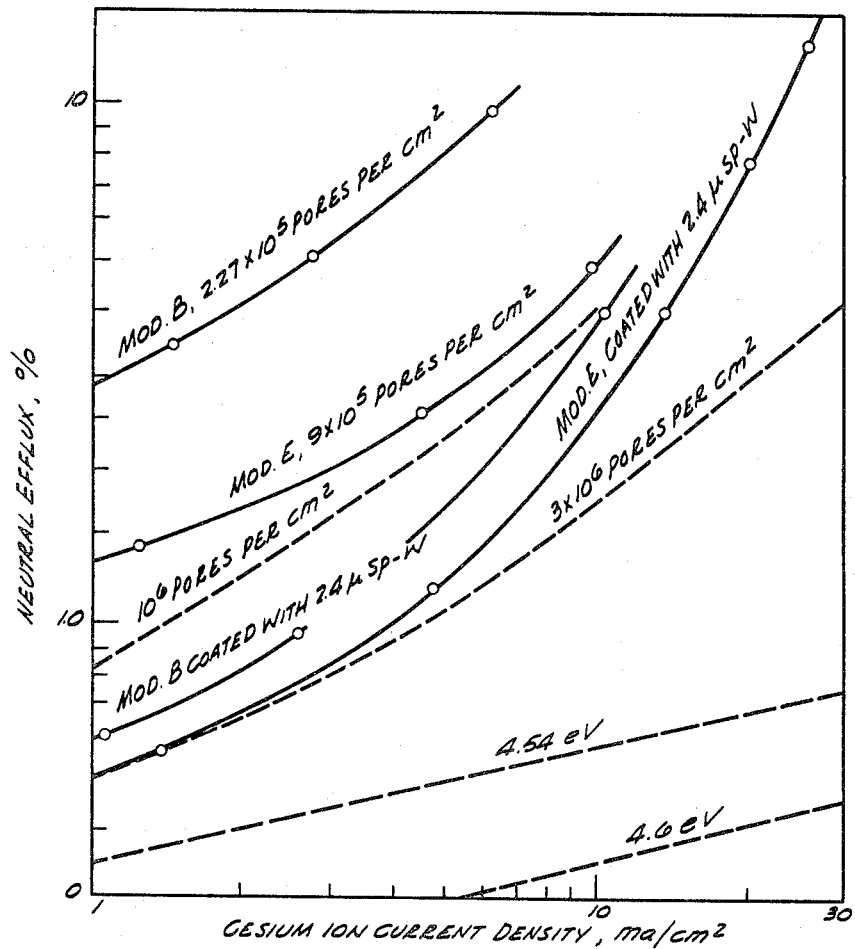
FIG. 3 is a graph showing the relationship between the efflux in percent and the cesium ion current density in milliamperes per square centimeter actually observed.

FIG. 3 indicates the experimentally investigated improvement of the surface ionization of cesium on coated refractory metal pellets. For comparison neutral efflux data is added in FIG. 3 for the uncoated material to show the relationship between Mod. E and Mod. B coated versus Mod. E and Mod. B uncoated. The higher pore density substrate Mod. E yields the lower neutral efflux with the same coat, as the low pore density Mod. B material.

Figure 4:
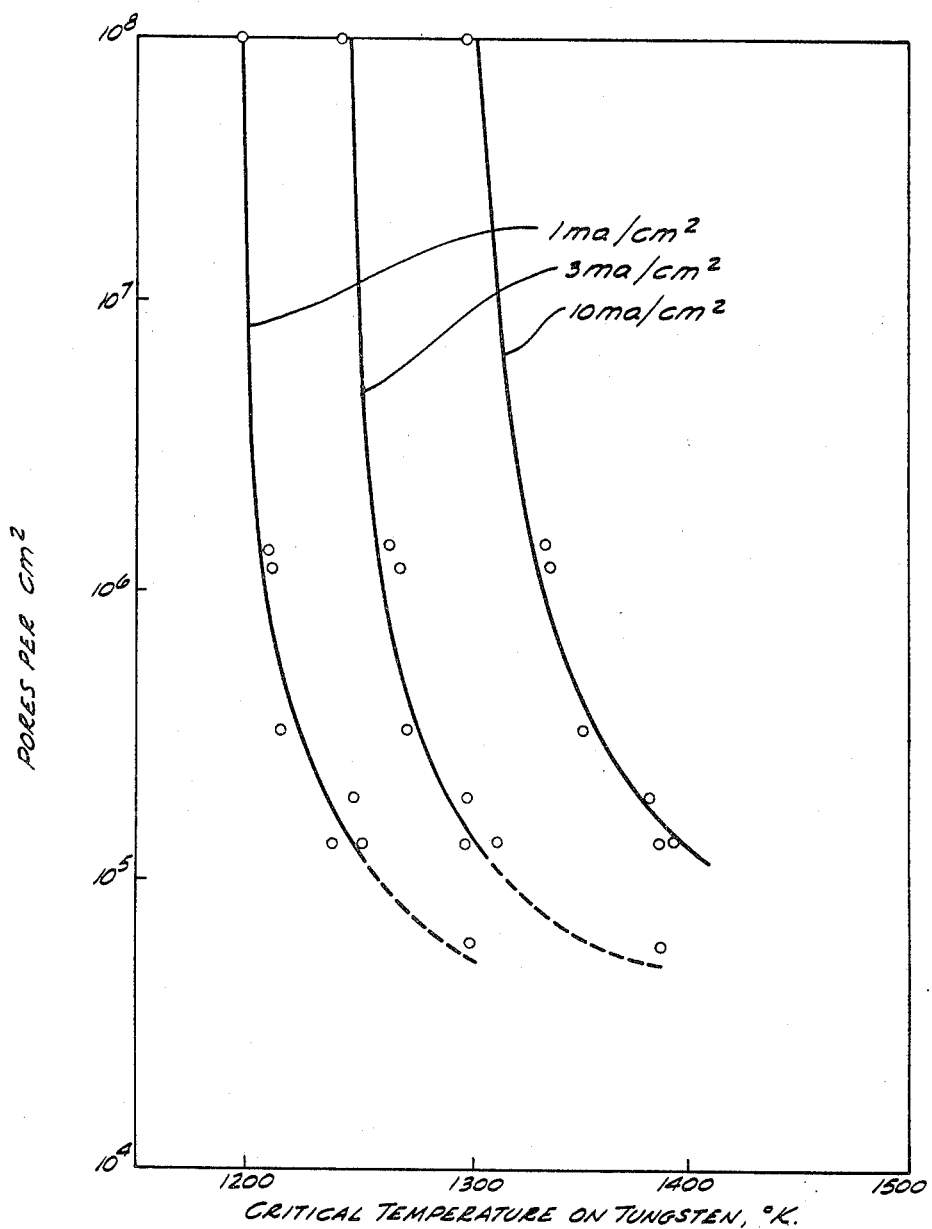
FIG. 4 is a graph showing the dependence of the critical temperature on porous tungsten on the number of pores per square centimeter.

FIG. 4 shows the decrease of the critical temperature $T_c$ with increasing pore density for surface ionization. Above pore density N greater than $10^6$, the dependence of the critical temperature on the pore density is quite small. In comparison to solid tungsten at 10 milliamperes per square centimeter ion current density, on porous tungsten with $10^6$ pores per square centimeter, the increase in critical temperature is 31° C. The points at $10^8$ pores per square centimeter are for solid tungsten.

A procedure for conducting a thin film, fine grain refractory metal powder deposition to produce a multi-layer ionizer of the invention has been developed. The fine grain coating material employed is mixed with sufficient deionized water to make a pasty slurry. Without adding any binder, this slurry is dispersed with a fine brush over the ion emission side of the porous substrate material. The surface layer thickness should be in the range of about 10 mils. As long as the paste has a thick consistency, its surface should be flattened and somewhat compressed.

The air dryed coating and substrate materials are covered with a weight to apply about 1 kg./cm.$^2$ pressure on the fine grain coating while being presintered at an appropriate sintering temperature. The sintering temperature employed depends on the grain size of the coating material. As an example, a sintering temperature of 2,000° K. for 15 minutes produces a densification of 76 percent of the theoretical maximum density for a 3.9 micron spherical tungsten powder. Thus the presintering temperature should not exceed about 1,600° K. for more than about 15 minutes for the tungsten powder to avoid overdensification of the thin film top layer.

After presintering the pellet in a hydrocarbon-free oven for 15 minutes, the coat and substrate combination structure is sintered in a vacuum furnace free of hydrocarbons in the $10^{-7}$ Torr pressure range at temperatures exceeding 1,700° C. A sintering pressure of 0.5 to 1.0 kg. per cm.$^2$ may improve the adherence of the coat to the substrate. Organic binders should be avoided.

Excessive sintering temperatures and sintering times yield surface layers having unduly low pore densities.

To insure long term stability of the porous ionizer, a fairly coarse substrate material is of advantage because sintering of the porous structure depends on the original powder grain size. The original powder grain size provides both the substrate mechanical strength and sintering stability. However, the most important requirement is low neutral efflux as connected with high pore density. To combine low neutral efflux with a high mechanical strength substrate we have to coat the substrate with fine grain refractory material of low density. The best distribution, connected with minimum sintering during ionizer operation, is achieved if several layers of porous material are employed on the substrate in such way that the grain size decreases with distance from the substrate.

Figure 5:
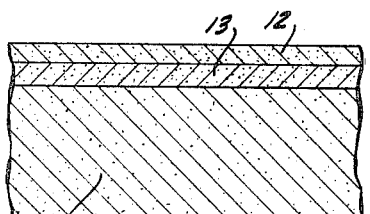
FIG. 5 is a view similar to that of FIG. 1, but showing a three-layer embodiment of the ionizer of the invention.

For tungsten, as a specific example, the substrate or bottom layer 14 can be made from powder with a grain size between about 6 and about 10 microns (FIG. 5) and sintered to a relatively high density, such as about 80 to 82 percent. The next or intermediate layer 13 can be made from powder in the grain size range between about 5 and 7 microns and the upper or top layer 12 in a three layer ionizer can be made the same way as described for layer 10 in the two layer structure of FIG. 1.

Obviously, many other modifications and variations of the present invention are possible in the light of the above teachings. It is therefore to be understood that, within the scope of the appended claims, the invention can be practiced otherwise than as specifically described.

What is claimed is:

1. A sintered, multilayer porous ionizer which consists of a relatively thin porous outer layer of refractory material of high pore density ranging from about $5 \times 10^6$ to about $5 \times 10^7$ pores per square centimeter, the thin layer being on a relatively thick porous substrate layer of refractory material of high pore density in the range from about $5 \times 10^5$ to about $5 \times 10^6$ pores per square centimeter adjacent the relatively thin layer of porous material.

2. A sintered, multilayer porous ionizer which consists of a relatively thin outer porous layer of refractory material of particles of grain size in the range from about 2 to about 6 microns and of high pore density ranging from about $5 \times 10^6$ to about $5 \times 10^7$ pores per square centimeter, the thin layer being on a relatively thick porous substrate layer of high pore density refractory material in the range from about $5 \times 10^5$ to about $5 \times 10^6$ pores per square centimeter adjacent the relatively thin layer of porous material.

3. A sintered, multilayer porous ionizer which consists of a relatively thin porous layer of refractory material having a density of about 60 to about 70 percent of the theoretical maximum density, particles of grain size on the order of 4 microns, and a pore density in the range from about $5 \times 10^6$ to about $5 \times 10^7$ pores per square centimeter on a relatively thick porous substrate layer of refractory material of particles of grain size on the order of 6 microns, and a high pore density in the range from about $5 \times 10^5$ to about $5 \times 10^6$ pores per square centimeter.

4. A sintered multilayer porous tungsten ionizer which consists of a relatively thin porous tungsten layer having a high pore density ranging from about $5 \times 10^6$ to $5 \times 10^7$ pores per square centimeter, the thin tungsten layer being on a relatively thick porous tungsten substrate layer of hight pore density on the range from about $5 \times 10^5$ to about $5 \times 10^6$ pores per square centimeter.

5. A sintered, multilayer porous tungsten ionizer which consists of a relatively thin porous tungsten layer of particles of grain size in the range from about 2 to about 6 microns and of high pore density ranging from about $5 \times 10^6$ to about $5 \times 10^7$ pores per square centimeter, the thin tungsten layer being on a relatively thick porous tungsten substrate layer of high pore density in the range from about $5 \times 10^5$ to about $5 \times 10^6$ pores per squrae centimeter.

6. A sintered, multilayer porous tungsten ionizer which consists of a relatively thin porous tungsten layer of particles of grain size in the range from about 3.0 to about 5.5 microns, and a density in the range from about 60 to about 70 percent of the theoretical maximum density on a relatively thick porous tungsten substrate layer of particles of grain size in the range from about 5.6 to about 7.0 microns, and a density in the range from about 72 to about 82 percent of the theoretical maximum density.

7. A sintered, multilayer porous tungsten ionizer which consists of a relatively thin porous tungsten layer of spherical particles of grain size of about 4.0 microns and a density of about 75 percent of the theoretical maximum density on a relatively thick porous tungsten substrate layer of spherical particles of grain size of about 6.0 microns and a density of about 80 percent of the theoretical maximum density.

8. A sintered, multilayer porous ionizer which consists of a relatively thin porous top layer of porous tungsten particles having a grain size in the range from about 2 to about 6 microns and a density ranging from about 60–70%, an intermediate layer of porous tungsten of particles having a grain size in the range from about 5 to about 7 microns and a density ranging from about 72–82%, and a bottom layer of porous tungsten of particles having a grain size in the range from about 6 to about 10 microns and a density ranging from about 80–82%.

References Cited

UNITED STATES PATENTS

| | | | |
|---|---|---|---|
| 2,464,517 | 3/1949 | Kurtz | 29—182.2 X |
| 2,722,626 | 11/1955 | Coppola et al. | 313—346 |
| 2,754,442 | 7/1956 | Boutry et al. | |
| 3,076,915 | 2/1963 | Gal et al. | 313—346 |
| 3,183,396 | 5/1965 | Becker et al. | 29—182.3 X |
| 3,243,637 | 3/1966 | Affleck | 313—346 |
| 3,285,714 | 11/1966 | Davies et al. | 29—182.2 X |
| 3,354,644 | 11/1967 | Moore | 60—202 |

CARL D. QUARFORTH, *Primary Examiner.*

A. J. STEINER, *Assistant Examiner.*

U.S. Cl. X.R.

29—182.3